2,795,293

COALESCING FITTING FOR OIL AEROSOLS

Arthur C. Allen, Chicago, Ill., assignor to Stewart-Warner Corporation, Chicago, Ill., a corporation of Virginia Application April 5, 1954, Serial No. 421,125

1 Claim. (Cl. 183—92)

My invention relates generally to lubricating apparatus, and more particularly to improved means for causing the coalescence of oil particles from an oil aerosol.

In lubricating systems of the oil aerosol type disclosed in Gothberg et al. Patent No. 2,642,156, an oil aerosol, mist, or fog is generated and conveyed through relatively large conduits to bearings or other parts to be lubricated. In some instances, such as in the lubrication of antifriction bearings operating at high speed, the oil aerosol may be conveyed and applied to the bearing as an aerosol, but in other types of bearings it is desirable that the oil particles in the aerosol be coalesced so that the oil may be fed to the bearing as drops of liquid oil.

In the lubrication of the latter type of bearings, it is desirable that the highest possible percentage of the oil particles in the aerosol be coalesced so that the atmosphere will not be polluted by the escape of a substantial portion of the oil aerosol from the bearing.

To obtain coalescence of the very fine particles of oil in the aerosol, in the order of one or two microns in diameter, it is necessary that these particles strike a surface with sufficient velocity that their kinetic energy is great enough to overcome the surface tension of the particles and thus cause them to "wet" the surface.

The present invention relates to an improved means for imparting the necessary high velocity to the oil particles of the oil aerosol so as to cause them to have sufficient kinetic energy to overcome the forces of surface tension and therefore to coalesce upon a surface against which they are directed.

It is thus an object of the invention to provide an improved fitting for causing coalescence of oil particles from an oil aerosol.

Other objects will become apparent from the following description, reference being had to the accompanying drawings, in which—

Figure 2:
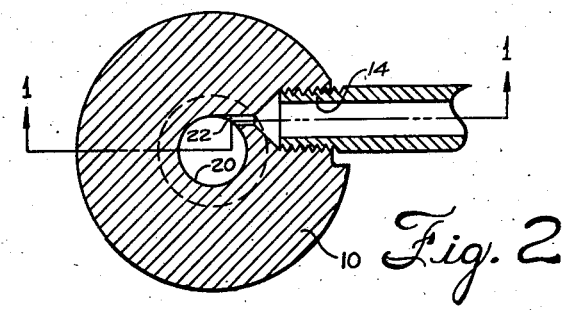
Fig. 2 is a transverse sectional view, taken on the line 2—2 of Fig. 1.
Figure 1:
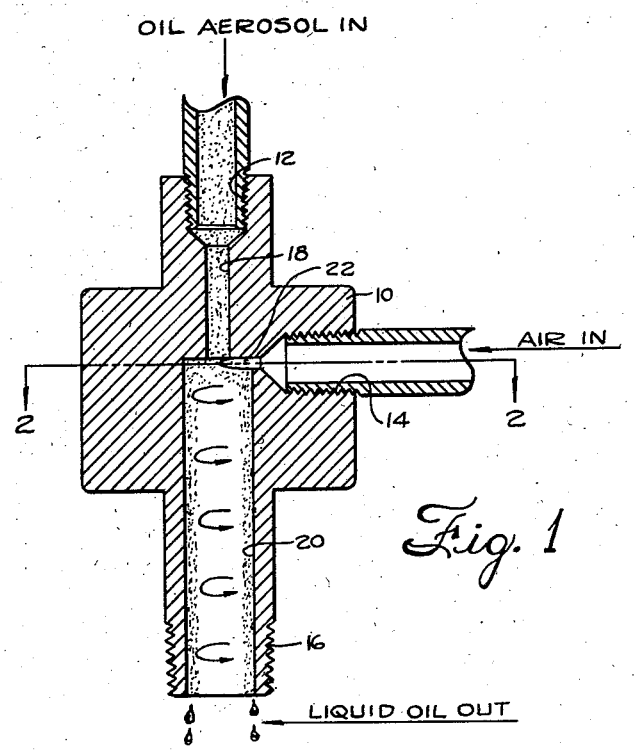
Fig. 1 is a vertical sectional view, taken on the line 1—1 of Fig. 2.

The fitting comprises a body 10 having means 12 for making connection with a conduit conveying an oil aerosol to the fitting, the means being illustrated as screw threads. Similar means 14 are provided for making connection with a conduit conveying compressed air to the fitting. The end of the shank 16 of the fitting is provided with threads for connection to a bearing or other part to be lubricated. The oil mist entering the inlet connection 12 is conveyed through a relatively small diameter duct 18 into a larger bore 20, the lower end of which forms an outlet. Compressed air is supplied to the upper end of bore 20 through a port 22 which opens tangentially into the upper end of the bore at or substantially at the junction of the bore 20 and small diameter duct 18.

The air stream tangentially introduced through the port 22 is supplied at sufficient velocity that it will flow downwardly in the bore 20 in a generally helical path, and due to this high velocity will entrain the oil particles supplied through the duct 18 and accelerate these particles to a velocity sufficiently great that these particles, due to the fact that their specific gravity is higher than that of the air, will pass through the swirling air stream and impinge upon the wall of the bore 20 with sufficient kinetic energy, resulting from centrifugal force, that the surface tension will be overcome and the particles will "wet" the surface of the bore and flow downwardly as a liquid to the part to be lubricated.

The air inlet connection 14 opens tangentially into the bore at or substantially at the junction of the bore 20 and small diameter duct 18 because in such location the initial entraining of the oil particles by the air stream occurs when the particles are travelling with increased velocity in a concentrated beam, and because such location of the air inlet connection 14 allows for greater distance of travel of the particles within the bore. Locating the air inlet in this position, therefore, results in more efficient coalescence.

The air which formed part of the oil aerosol, as well as the secondary air supplied through the inlet connection 14, will flow through the bearing or other part being lubricated and be more or less effective as a coolant.

By the use of a lubricating system of the type employing the above described oil coalescing fittings, the rate at which the lubricant is supplied to the bearing may be very accurately controlled so that the supply of excessive quantities of oil to the bearing, with consequent overheating, is readily avoided. It has been found that with a fitting of this type a very high percentage of the oil particles will be coalesced from the oil aerosol.

While I have shown and described a preferred embodiment of my invention, it will be apparent that numerous variations and modifications thereof may be made without departing from the underlying principles of the invention. I therefore desire, by the following claim, to include within the scope of the invention all such variations and modifications by which substantially the results of my invention may be obtained through the use of substantially the same or equivalent means.

I claim:

A coalescing fitting for use in oil aerosol lubricating systems, comprising an elongated body having a bore extending through a substantial length thereof, and having an inlet passageway of less diameter than that of the bore, the bore having an inlet end and an outlet end, means to conduct an aerosol oil mist to the reduced diameter passageway, means for introducing air under pressure tangentially at substantially the juncture of the inlet passageway with the bore to cause high velocity swirling motion of the oil aerosol introduced into the bore through the inlet passageway, and means at the opposite end of the bore to make connection to a bearing for receiving oil coalesced throughout the length of the bore.

References Cited in the file of this patent

UNITED STATES PATENTS

| | | |
|---|---|---|
| 1,276,291 | Walling | Aug. 20, 1918 |
| 1,874,209 | Schnabel | Aug. 30, 1932 |
| 2,636,430 | Brown | Apr. 28, 1953 |